(12) United States Patent
Turbide et al.

(10) Patent No.: US 10,564,268 B2
(45) Date of Patent: Feb. 18, 2020

(54) PHASE-ERROR CORRECTION IN A SYNTHETIC APERTURE IMAGING SYSTEM WITH LOCAL OSCILLATOR TIME DELAY ADJUSTMENT

(71) Applicant: INSTITUT NATIONAL D'OPTIQUE, Québec (CA)

(72) Inventors: Simon Turbide, Québec (CA); Alain Bergeron, Québec (CA)

(73) Assignee: INSTITUT NATIONAL D'OPTIQUE, Quebec (CA)

( * ) Notice: Subject to any disclaimer, the term of this patent is extended or adjusted under 35 U.S.C. 154(b) by 383 days.

(21) Appl. No.: 15/436,017

(22) Filed: Feb. 17, 2017

(65) Prior Publication Data

US 2018/0241477 A1    Aug. 23, 2018

(51) Int. Cl.

| | |
|---|---|
| *G01S 7/00* | (2006.01) |
| *G01S 7/497* | (2006.01) |
| *G01S 17/89* | (2020.01) |
| *G01S 17/10* | (2020.01) |
| *G01S 7/486* | (2020.01) |
| *G01S 17/32* | (2020.01) |

(52) U.S. Cl.
CPC .............. *G01S 7/497* (2013.01); *G01S 7/486* (2013.01); *G01S 17/102* (2013.01); *G01S 17/895* (2013.01); *G01S 17/325* (2013.01)

(58) Field of Classification Search
None
See application file for complete search history.

(56) References Cited

U.S. PATENT DOCUMENTS

| | | | |
|---|---|---|---|
| 4,924,229 A | 5/1990 | Eichel et al. | |
| 6,559,932 B1 | 5/2003 | Halmos | |
| 6,879,279 B2 | 4/2005 | Stappaerts | |
| 7,345,744 B2 | 3/2008 | Halmos et al. | |
| 7,474,332 B2 | 1/2009 | Byren | |
| 8,629,975 B1 | 1/2014 | Dierking et al. | |

(Continued)

OTHER PUBLICATIONS

P. H. Eichel and C. V. Jakowatz, Jr., "Phase-gradient algorithm as an optimal estimator of the phase derivate", Optics Letters, Oct. 15, 1989, vol. 14, No. 20, p. 1101-1103, Optical Society of America.

(Continued)

*Primary Examiner* — Hovhannes Baghdasaryan
(74) *Attorney, Agent, or Firm* — Merchant & Gould P.C.

(57) ABSTRACT

A method is for phase-error correction in a synthetic aperture (SA) imaging system. A transmission signal and a local oscillator (LO) signal are generated with a relative time delay, which can be adjusted in real-time to match a range to a target region to be imaged. A portion of the transmission signal is transmitted onto the target region and a return signal is collected and mixed with a portion of the LO signal to provide a raw SA signal. Transmission and LO phase errors associated respectively with the transmission and LO signals are determined, as well as a frequency jitter between the transmission and LO signals. A phase-corrected SA signal is obtained by applying a phase correction to the raw SA signal based on the transmission phase error, the LO phase error and the frequency jitter. An SA imaging system is capable of implementing the method for phase-error correction.

18 Claims, 6 Drawing Sheets

(56) References Cited

U.S. PATENT DOCUMENTS

| | | |
|---|---|---|
| 8,842,036 B2 | 9/2014 | Pritt et al. |
| 9,001,116 B2 | 4/2015 | Ben-David et al. |
| 9,134,414 B2 | 9/2015 | Bergeron et al. |
| 9,523,766 B2 | 12/2016 | Turbide |
| 2006/0279723 A1* | 12/2006 | Halmos .................. G01S 7/497 356/5.15 |
| 2011/0273585 A1 | 11/2011 | Stirling-Gallacher |
| 2017/0031012 A1 | 2/2017 | Hairston et al. |
| 2018/0224547 A1 | 8/2018 | Crouch et al. |

OTHER PUBLICATIONS

Simon Turbide, Linda Marchese, Marc Terroux, Alain Bergeron, "Investigation of Synthetic Aperture Ladar for Land Surveillance Applications", Proc. of SPIE, 2013, vol. 8897, 8 pages.

Brian W. Krause, Joe Buck, Chris Ryan, David Hwang, Piotr Kondratko, Andrew Malm, Andy Gleason and Shaun Ashby, "Synthetic Aperture Ladar Flight Demonstration", OSA/CLEO, 2011, 2 pages.

Steven M. Beck, Joseph R. Buck, Walter F. Buell, Richard P. Dickinson, David A. Kozlowski, Nicholas J. Marechal and Timothy J. Wright, "Synthetic-aperture imaging laser radar: laboratory demonstration and signal processing", Applied Optics, Dec. 10, 2005, vol. 44, No. 35, p. 7621-7629.

M. Bashkansky, R. L. Luche, E. Funk, L.J. Richard and J. Reintjes, "Two-dimensional synthetic aperture imaging in the optical domain", Optics Letters, Nov. 15, 2002, vol. 27, No. 22, p. 1983-1985, Optical Society of America.

Dale C. Griffith, "Phase Error Compensation Technique for Improved Synthetic Aperture Radar Performance", Johns Hopkins Apl Technical Digest, 1997, vol. 18, No. 3, p. 358-364.

Richards, M., "A Beginner's Guide to Interterometric SAR Concepts and Signal Processing", IEEE A&E Systems Magazine, Part 2: Tutorials-Richards, 22(9): 5-29 (2007).

\* cited by examiner

PHASE-ERROR CORRECTION IN A SYNTHETIC APERTURE IMAGING SYSTEM WITH LOCAL OSCILLATOR TIME DELAY ADJUSTMENT

TECHNICAL FIELD

The technical field generally relates to synthetic aperture (SA) imaging, and more particularly, to techniques for phase-error correction in a synthetic aperture imaging system with local oscillator (LO) time delay adjustment.

BACKGROUND

SA imaging can be used to increase resolution beyond the diffraction limit of a physical aperture of an imaging system. In SA imaging systems, a large "virtual" aperture is synthesized along a path by coherently summing the amplitude and phase information of return echoes from a plurality of electromagnetic signals sequentially transmitted by a relatively small physical aperture provided on a platform moving along the path. SA imaging systems generally include a transmitter-receiver unit mounted on an airborne, spaceborne, or terrestrial platform traveling along a path over a target region to be imaged. The transmitter-receiver unit directs a plurality of electromagnetic signals onto the target region and collects a series of phase-coherent return echoes corresponding to the electromagnetic signals reflected by the target region. The return echoes can be recorded, and then coherently combined using signal processing techniques to reconstruct a high-resolution image of the target region.

SA imaging was initially developed and has been successfully employed at radio frequencies, where it is referred to as "synthetic aperture radar" (SAR) imaging. Conventional SAR systems typically operate in the centimeter (cm) wavelength range and produce images with azimuth resolutions of the order of a decimeter (dm) to a meter (m), depending on the applications. As resolution is generally inversely proportional to the wavelength used for imaging, there has been a growing interest to extend SAR technology to shorter wavelengths. In this context, an emerging technology referred to as "synthetic aperture ladar" (SAL) imaging has been developed to apply SAR technology to the visible and near-infrared portions of the electromagnetic spectrum. It is envisioned that SAL could produce images with azimuth resolutions of centimeters or less, and provide information complementary to that provided by SAR systems. Most implementations of SAL imaging are based on coherent detection with chirped signals. In coherent detection, the return signal reflected by the target is mixed with an LO reference signal. The mixing of the return signal with the LO signal results in the generation of a beat signal having a frequency equal to the difference between the frequencies of the two mixed signals. The beat frequency depends on the difference between the path length of the LO signal and the path length of the main signal from the source to the target and back to the detector.

A challenge in SAL imaging lies in the adjustment of the optical path length of the LO signal to match the round-trip path length of the transmitted/returned (main) signal, to ensure that the spectrum of the beat signal falls within the bandwidth of the detector. One existing approach devised to tackle with this challenge is to use an optical delay, for example an optical fiber, to delay the LO signal by an amount that is approximately equal to the round-trip time to the target. A drawback of this approach is that different delay lines must be used for different target ranges, thus preventing or hindering the ability to make real-time or near real-time adjustment of the relative path length difference between the main and LO signals. Another challenge in SAL imaging is the measurement and correction of phase errors. As SAL imaging relies on coherent detection, it is susceptible to laser phase noise. Laser phase noise arises from the finite coherence length and other instabilities of laser sources and causes phase errors that can degrade the image reconstruction process. Furthermore, any uncompensated fluctuations in the relative path length difference, or relative temporal delay, between the main signal and the LO signal can affect the phase of the measured signal and, in turn, lead to phase errors that impair the integrity of the measured signals. Challenges therefore remain in the field of SAL imaging involving LO delay adjustment and associated phase-error compensation.

SUMMARY

In accordance with an aspect, there is provided a method for phase-error correction in a synthetic aperture (SA) imaging system. The method includes:
  (a) generating a transmission signal;
  (b) generating a local oscillator (LO) signal, the transmission signal and the LO signal being generated with a time delay relative to each other;
  (c) transmitting a first portion of the transmission signal onto a target region and collecting a return signal produced by reflection of the first portion of the transmission signal from the target region;
  (d) mixing the return signal with a first portion of the LO signal to provide a raw SA signal;
  (e) determining, using a second portion of the transmission signal, a transmission phase error associated with the transmission signal;
  (f) determining, using a second portion of the LO signal, an LO phase error associated with the LO signal;
  (g) mixing a third portion of the transmission signal with a third portion of the LO signal to provide a transmission-LO signal, and determining, from the transmission-LO signal and based on the transmission phase error and the LO phase error, a frequency jitter between the transmission signal and the LO signal; and
  (h) applying a phase correction to the raw SA signal based on the transmission phase error, the LO phase error and the frequency jitter to obtain a phase-corrected SA signal.

In accordance with another aspect, there is provided a synthetic aperture (SA) imaging system. The SA imaging system includes:
  a source assembly generating a transmission signal and a local oscillator (LO) signal, the transmission signal and the LO signal being generated with a time delay relative to each other;
  a transmitter-receiver unit transmitting a first portion of the transmission signal onto a target region, and collecting a return signal produced by reflection of the first portion of the transmission signal from the target region;
  a return signal mixer configured to mix the return signal with a first portion of the LO signal to provide a raw SA signal;
  a transmission interferometer configured to mix a second portion of the transmission signal with a spatially delayed version thereof to produce a transmission interference signal;

an LO interferometer configured to mix a second portion of the LO signal with a spatially delayed version thereof to produce an LO interference signal;

a transmission-LO mixer configured to mix a third portion of the transmission signal with a third portion of the LO signal to produce a transmission-LO signal;

a detector assembly detecting the raw SA signal, the transmission interference signal, the LO interference signal and the transmission-LO signal outputted by the return signal mixer, the transmission interferometer, the LO interferometer and the transmission-LO mixer, respectively; and a processing unit coupled to the detector assembly and configured to:

determine, from the transmission interference signal, a transmission phase error associated with the transmission signal;

determine, from the LO interference signal, an LO phase error associated with the LO signal;

determine, from the transmission-LO signal and based on the transmission phase error and the LO phase error, a frequency jitter between the transmission signal and the LO signal; and apply a phase correction to the raw SA signal based on the transmission phase error, the LO phase error and the frequency jitter to obtain a phase-corrected SA signal.

Other features and advantages of the present description will become more apparent upon reading of the following non-restrictive description of specific embodiments thereof, given by way of example only with reference to the accompanying drawings.

DETAILED DESCRIPTION

Figure 1:
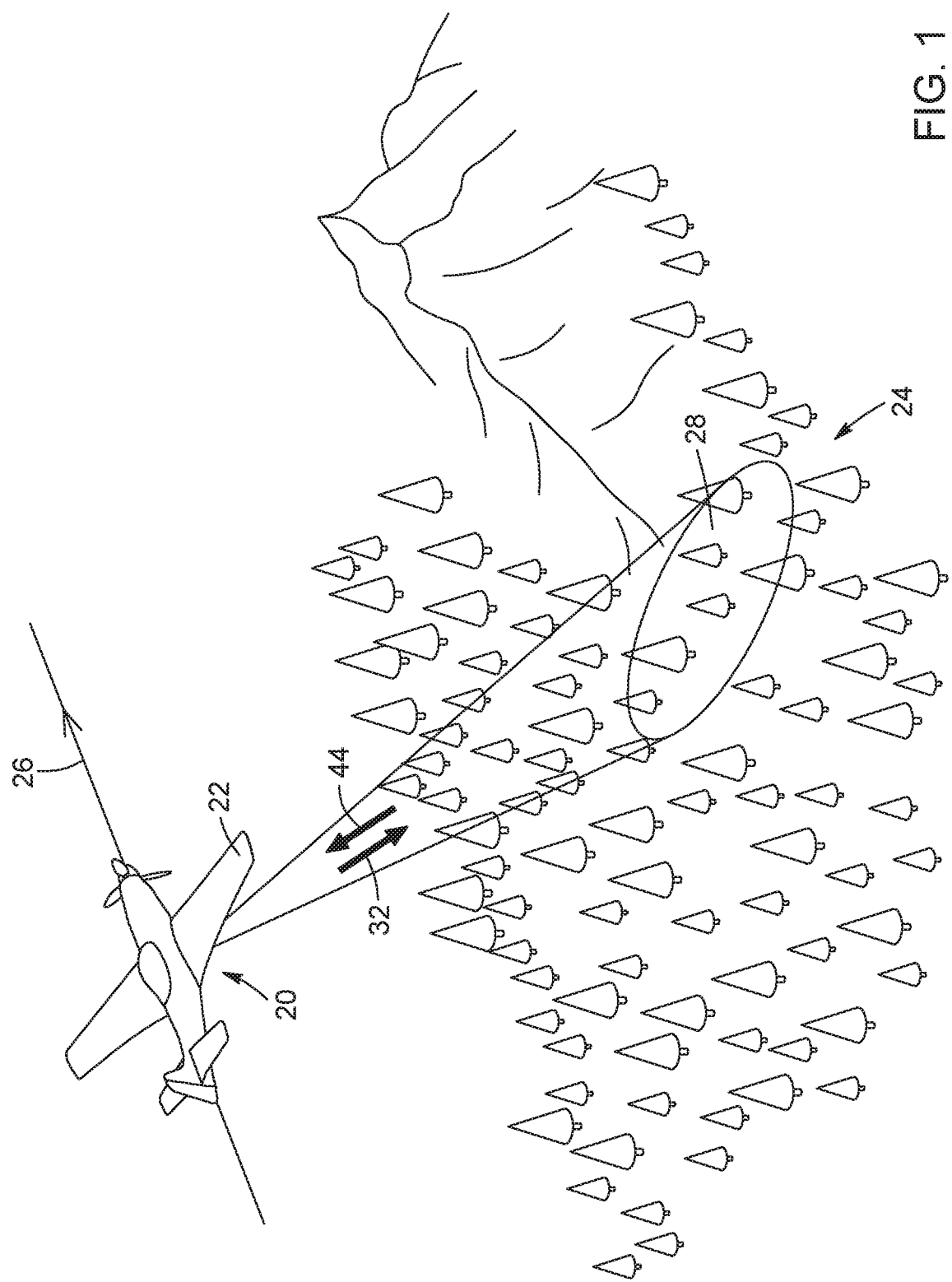
FIG. 1 is a schematic perspective view of a conventional SA imaging system mounted on a platform moving relative to a scene along a flight trajectory.

In the following description, similar features in the drawings have been given similar reference numerals, and, to not unduly encumber the figures, some elements may not be indicated on some figures if they were already identified in one or more preceding figures. It should also be understood herein that the elements of the drawings are not necessarily depicted to scale, since emphasis is placed upon clearly illustrating the elements and structures of the present embodiments.

The present description generally relates to a method for phase-error correction in a synthetic aperture (SA) imaging system with temporal delay adjustment of the local oscillator (LO) signal. The present description also generally relates to an SA imaging system capable of implementing the method.

Referring to FIG. 1, there is provided a schematic representation of a conventional SA imaging system 20 mounted on a moving platform 22 flying over a scene 24, for example a ground surface of the Earth, along a flight trajectory 26. The SA imaging system 20 is configured to acquire an image of a target region 28 of the scene 24. The target region 28 corresponds to an area or feature of interest in the scene 24 whose image is to be obtained through appropriate processing of SA data. The acquisition of the SA data from the target region 28 can involve illuminating the target region 28 with a transmission signal 32 and collecting a return signal 44 produced by reflection of the transmission signal 32 from the target region 28. As the platform 22 travels along the flight trajectory 26, the area of the scene 24 which is illuminated by the transmission signal 32 is also moving, thereby defining the target region 28 of the scene 24. The range to the target region 28 can be deduced from the phase of the return signal. A processing unit can analyze data representing the coherent combination of the amplitude and phase information of a plurality of return signals received at different platform positions to reconstruct an image representative of the target region.

The present techniques can be particularly suitable for use in SA ladar (SAL) applications employing wavelengths in the visible or near-infrared portions of the electromagnetic spectrum. Those skilled in the art will recognize, however, that the methods and systems described herein can also be applied to other types of SA imaging modalities, including, but not limited to, SA radar (SAR) imaging, SA terahertz imaging, SA infrared imaging, SA sonar (SAS) imaging, and SA ultrasound (SAU) imaging. It is noted that acoustic waves rather than electromagnetic waves are employed to form the synthetic aperture in SAS and SAU imaging. In the present description, the terms "light" and "optical" are used to refer to radiation in any appropriate region of the electromagnetic spectrum. More particularly, the terms "light" and "optical" are not limited to visible light, but can also include, for example, the radio, microwave, terahertz, infrared, and ultraviolet wavelength ranges. For example, the terms "light" and "optical" can encompass electromagnetic radiation having a wavelength ranging from a few hundreds of nanometers (nm) to a few micrometers (μm) in SAL applications.

As mentioned above, SAL employs coherent detection. In coherent detection, the return signal reflected by the target is mixed with an LO signal. The mixing of the return signal with the LO signal generates a beat signal having a frequency, called the beat frequency, equal to the difference between the frequencies of the two mixed signals. The phase, frequency and other spectral characteristics of the return signal can be extracted from the beat signal to provide information about the target region. The beat frequency depends on the difference between the path length of the LO signal and the round-trip path length of the transmitted/returned (main) signal. A challenge in SAL is to adjust the LO signal relative to the transmission signal to ensure that the spectrum of the beat signal falls within the bandwidth of the detector, while at the same time keeping phase errors below a specified threshold. Indeed, phase errors can manifest themselves as image artifacts, a loss of resolution, and a reduction in the signal-to-noise ratio (SNR), which combine to blur or otherwise degrade the quality of the reconstructed images. Thus, to form SAL images of sufficiently high quality, it is desirable that phase errors be measured or calculated so that they can be corrected during the image reconstruction process.

In some implementations, the method for phase-error correction can include generating a transmission signal and an LO signal from two distinct linearly chirped laser pulses such that these signals are generated with a relative time delay. A portion of the transmission signal is directed onto a target region to be imaged, and a return signal produced by reflection of the portion of the transmission signal from the target region is collected and mixed with a portion of the LO signal to provide a raw SA signal. The time delay between the transmission signal and the LO signal is adjusted to match the round-trip time to the target region. One feature of some implementations of the method described herein is that the LO time delay can be adjusted in real-time or near real-time during data acquisition in accordance with target range variations. This flexibility in adjusting the delay of the LO signal can be advantageous compared to existing methods in which the transmission signal and the LO signal come from the same optical signal and different optical delay lines are used for different target ranges to delay the LO signal by an amount that is approximately equal to the round-trip time to the target. However, the fact that the transmission signal and the LO signal originate from different optical signals, and in most cases different optical sources, can make the present techniques more susceptible to phase errors than existing methods. In this context, the present techniques provide a method for determining and correcting phase errors in and between the transmission signal and the LO signal, as will be described in greater detail below.

Figure 2:
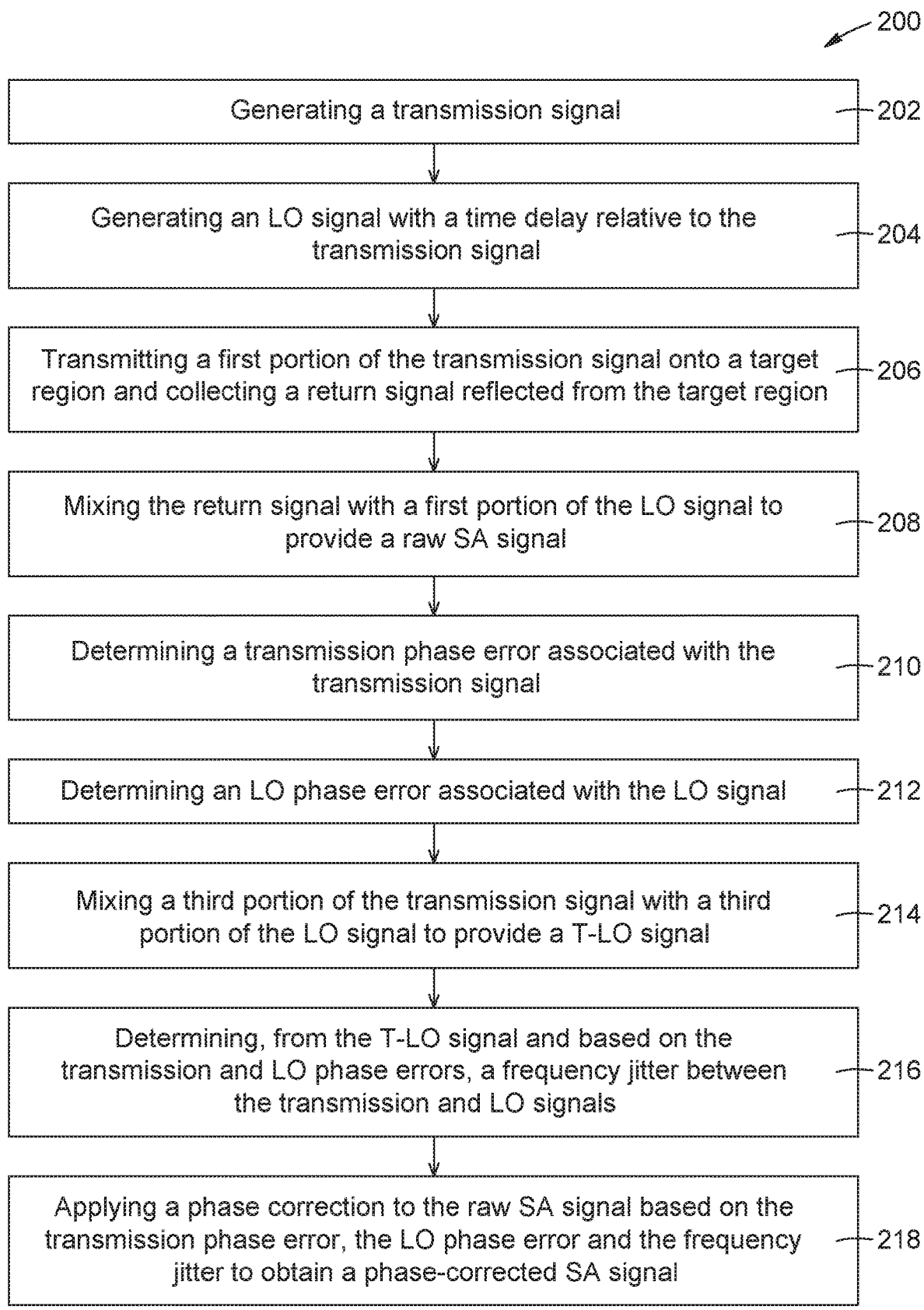
FIG. 2 is a flow chart of a method for phase-error correction in an SA imaging system, in accordance with an embodiment.

Referring to FIG. 2, there is provided a flow chart of an embodiment of a method 200 for phase-error correction in an SA imaging system providing real-time adjustment of the timing of the LO signal relative to the transmission signal. By way of example, the method 200 of FIG. 2 can be implemented in SA imaging systems 20 such as those illustrated in FIGS. 3 to 6, or in other SA imaging systems. In FIG. 2, the method 200 first includes a step 202 of generating a transmission signal and a step 204 of generating a local oscillator (LO) signal, where the transmission signal and the LO signal are generated with a time delay relative to each other. It will be understood that depending on the application and the configuration of the SA imaging system, the LO signal can be generated either before or after the transmission signal.

Figure 3:
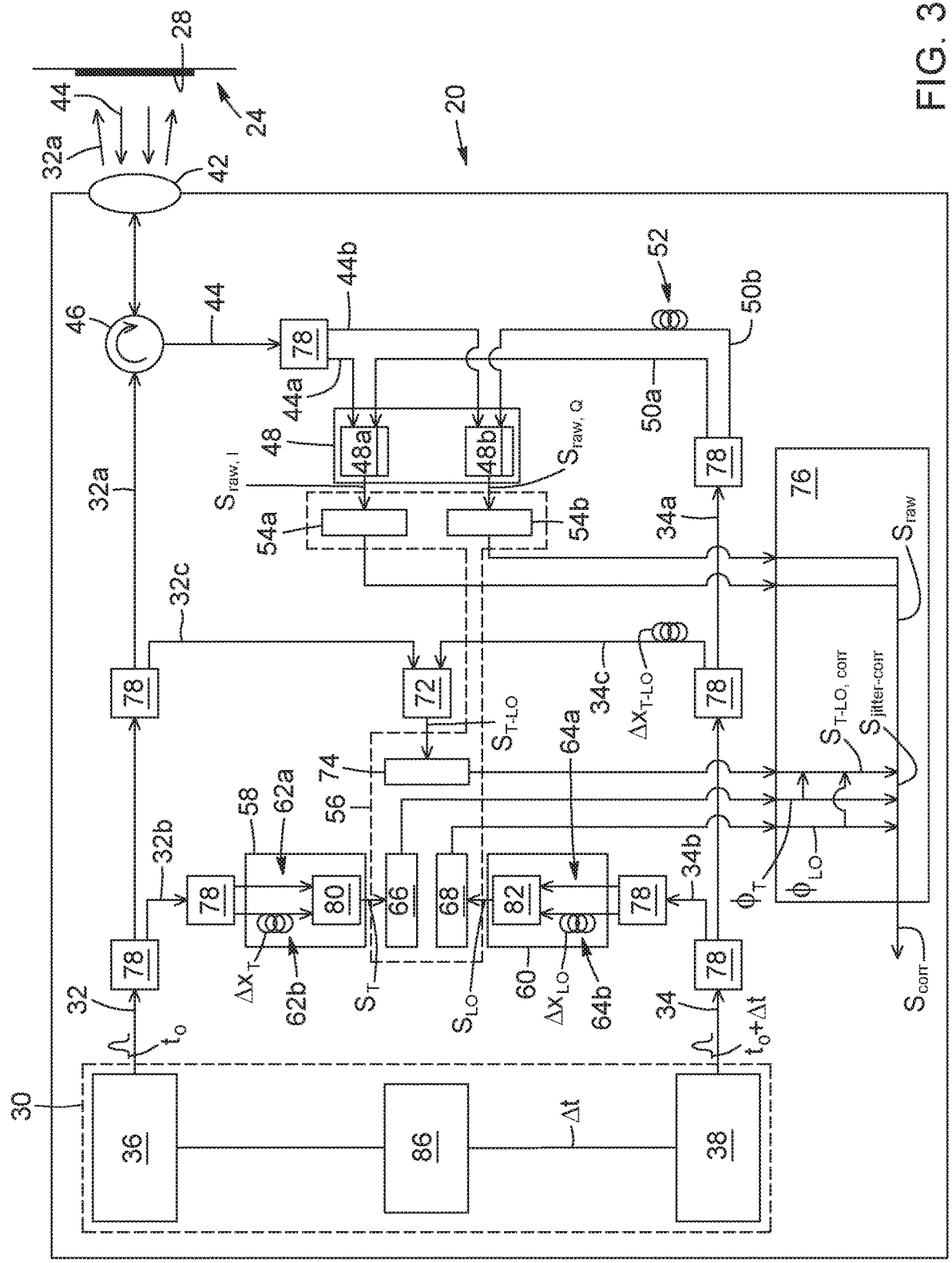
FIG. 3 is a schematic block diagram of an SA imaging system, in accordance with another embodiment.

Turning to FIG. 3, there is provided a schematic block diagram of an embodiment of an SA imaging system 20 configured for SAL applications, for example in the near-infrared. As mentioned above, other embodiments of the SA imaging system 20 can be configured to perform SA imaging in other wavelength ranges. The SA imaging system 20 includes a source assembly 30 for generating the transmission signal 32 and the LO signal 34. The source assembly 30 can be embodied by any appropriate device or combination of devices apt to generate a transmission signal 32 and an LO signal 34 suitable for SA imaging. In the illustrated embodiment, the SA imaging system 20 transmits the transmission signal 32 and the LO signal 34 using optical fibers. However, in other implementations, bulk optical components could be used instead of fiber-based components. It is noted that optical splitters 78, for example fiber splitters, can be used to extract the different portions of the transmission signal 32 and the LO signal 34 described below.

In the illustrated embodiment, the source assembly 30 includes a transmission optical source 36 that generates the transmission signal 32 at a time $t_0$ and an LO optical source 38, distinct from the transmission optical source 36, that generates the LO signal 34 at time $t_0+\Delta t$, where $\Delta t$ is the time delay between the two signals 32, 34. A delay controller 86 operatively connected to the transmission and LO optical sources 36 and 38 can be used to control the time delay $\Delta t$ between the transmission signal 32 and the LO signal 34. As mentioned above, depending on the application, the time delay $\Delta t$ can be positive or negative depending on whether the LO signal 34 is generated after or before the transmission signal 32, respectively. In SAL, the two optical sources 36, 38 can be laser sources. Depending on the application, the laser sources may be operated in continuous wave or pulsed regime, and may or may not be modulated. For example, in some implementations, each one of the transmission optical source 36 and the LO optical source 38 can be embodied by a pulsed fiber laser system provided with a directly modulated laser diode configured to perform a linear frequency modulation, or chirp modulation, of the transmission signal 32 and the LO signal 34. Depending on the application, the chirp can be an up-chirp or a down-chirp. In some implementations, the transmission signal 32 and the LO signal 34 can have a nonlinear chirp waveform.

It is noted that other types of optical sources can be used in other embodiments including, but not limited to, a gas laser, a solid-state laser, a diode laser, a dye laser, a fiber laser, and the like. Also, in some implementations, the transmission signal and the LO signal can be modulated externally, that is, after signal generation, for example using a waveform modulator or a phase shifter provided outside and downstream of the transmission optical source and the LO optical source. For example, chirped signals can be generated with a continuous-wave source having its output coupled to an external phase modulator. It is noted, however, that direct modulation may be preferred in some applications since it can provide chirp bandwidths that are significantly larger than those achievable by external modulation (e.g., as large as 1 nm for direct modulation versus less than $10^{-3}$ nm for external modulation).

In some implementations, the transmission signal and the LO signal are linearly chirped pulses whose time-dependent electric fields $E_T(t)$ and $E_{LO}(t)$ can be written as:

$$E_T(t)=A_T(t)\exp\{i[2\pi f_0 t+K_T t^2+\phi_T(t)]\}, \quad (1)$$

$$E_{LO}(t)=A_{LO}(t)\exp\{i[2\pi(f_0-\Delta f)(t-\Delta t-\delta t)+\pi K_{LO}(t-\Delta t-\delta t)^2+\phi_{LO}(t-\Delta t-\delta t)]\}. \quad (2)$$

In Equation (1) and (2), $f_0$ and $f_0-\Delta f$ are the center frequencies, $K_T$ and $K_{LO}$ are the chirp rates, $A_T(t)$ and $A_{LO}(t)$ are the pulse amplitudes. By way of example, in SAL applications, the transmission and LO signals can have a center frequency of about 30 to 300 terahertz (THz) (e.g., 193 THz, corresponding to a wavelength of 1.55 μm), a pulse duration ranging from a few nanoseconds (ns) to a few microseconds (μs), and a chirp rate ranging from $3\times10^{16}$ hertz/second (Hz/s) to $3\times10^{19}$ Hz/s, which can correspond to a chirp bandwidth of about 0.1 THz. In general, the chirp rates $K_T$ and $K_{LO}$ are designed or adjusted to be nominally identical to each other. In the present description, the terms "nominal" and "nominally" when referring to a value or an amount mean an intended, expected or predetermined value or amount that may differ from the actual value or amount.

Referring still to Equations (1) and (2), the terms $\phi_T(t)$ and $\phi_{LO}(t-\Delta t-\delta t)$ represent phase errors that account for deviations of $E_T(t)$ and $E_{LO}(t)$ from perfectly linear chirp waveforms. The sum of the terms $\Delta t$ and $\delta t$ represents the actual temporal delay between the transmission signal and the LO signal. First, the term $\Delta t$ corresponds to the nominal temporal delay, which is set and controlled by the delay controller. The nominal time delay $\Delta t$ can be adjusted based on, and preferably to match, the round-trip time to the target region, to ensure that the spectrum of the beat signal falls within the bandwidth of the detector. This delay can depend on the range to the target region, the SA looking angle, and the beam footprint of the transmission signal. By way of example, the time delay will be of the order of about ±2 µs to accommodate fluctuations in the range to the target region of the order of ±300 m. It is a feature of some implementations of the present techniques that the time delay of the LO signal with respect to the transmission signal can be adjusted in real-time or near real-time as a function of fluctuations in the range to target region during data acquisition. Second, the term δt is an error term accounting for the deviation of the actual temporal delay from the nominal temporal delay. The term δt can also be referred to as the "timing jitter" on the nominal time delay Δt. As used herein, the term "jitter" refers to the difference between the expected time and the actual time when an event occurs.

The term Δf is a frequency offset between the center frequency $f_0$ of the transmission signal and the center frequency $f_0 - \Delta f$ of the LO signal. Indeed, while the center frequencies of the two signals are generally intended or expected to be identical, in practice, the measured values generally differ from each other and fluctuate from sweep to sweep due to phase noise caused by temperature fluctuations, mechanical vibrations, fluctuations in the laser drive current, and other noise effects. The term Δf can be referred to as the "frequency-offset jitter".

Figure 4:
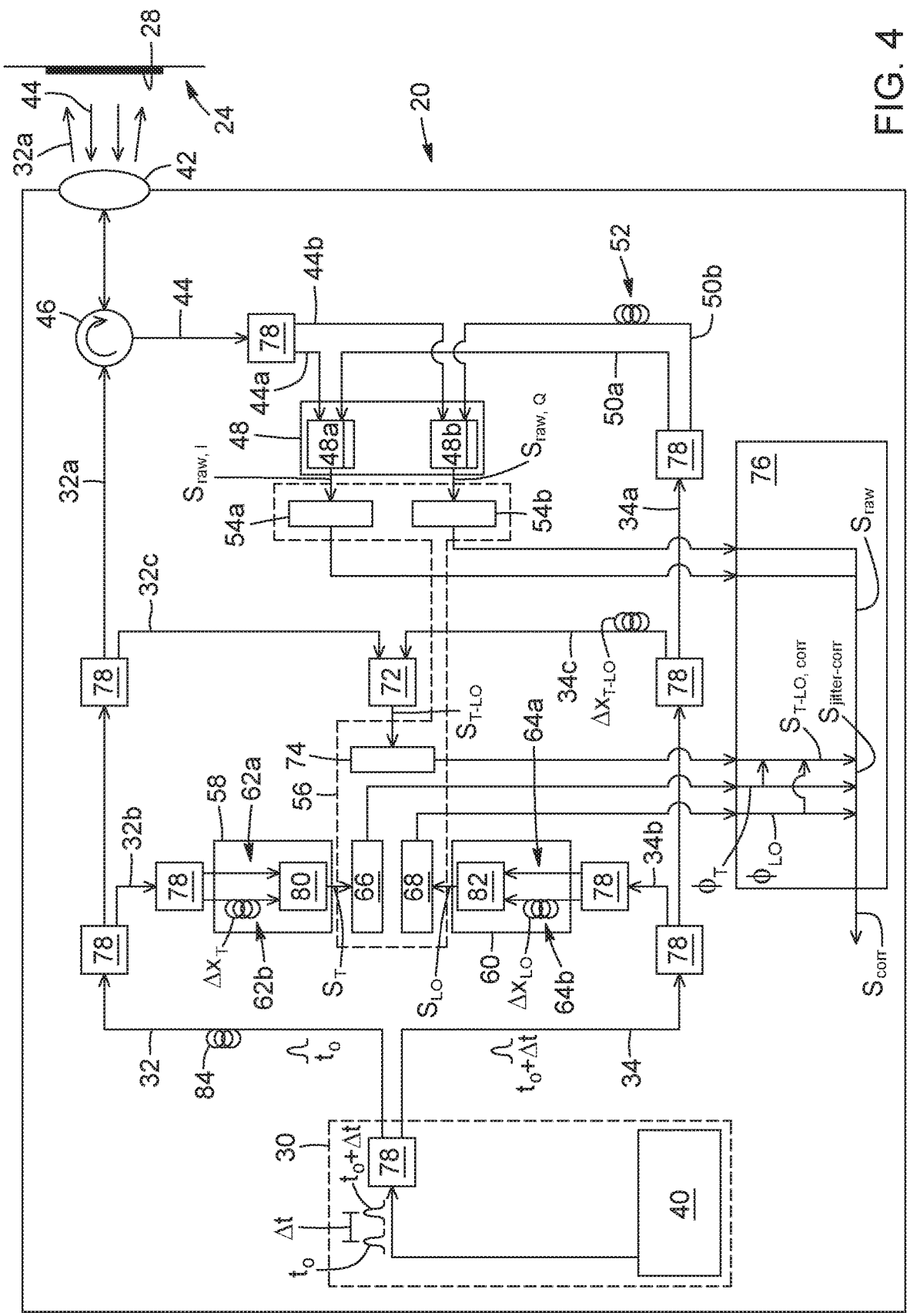
FIG. 4 is a schematic block diagram of an SA imaging system, in accordance with another embodiment.
Figure 5:
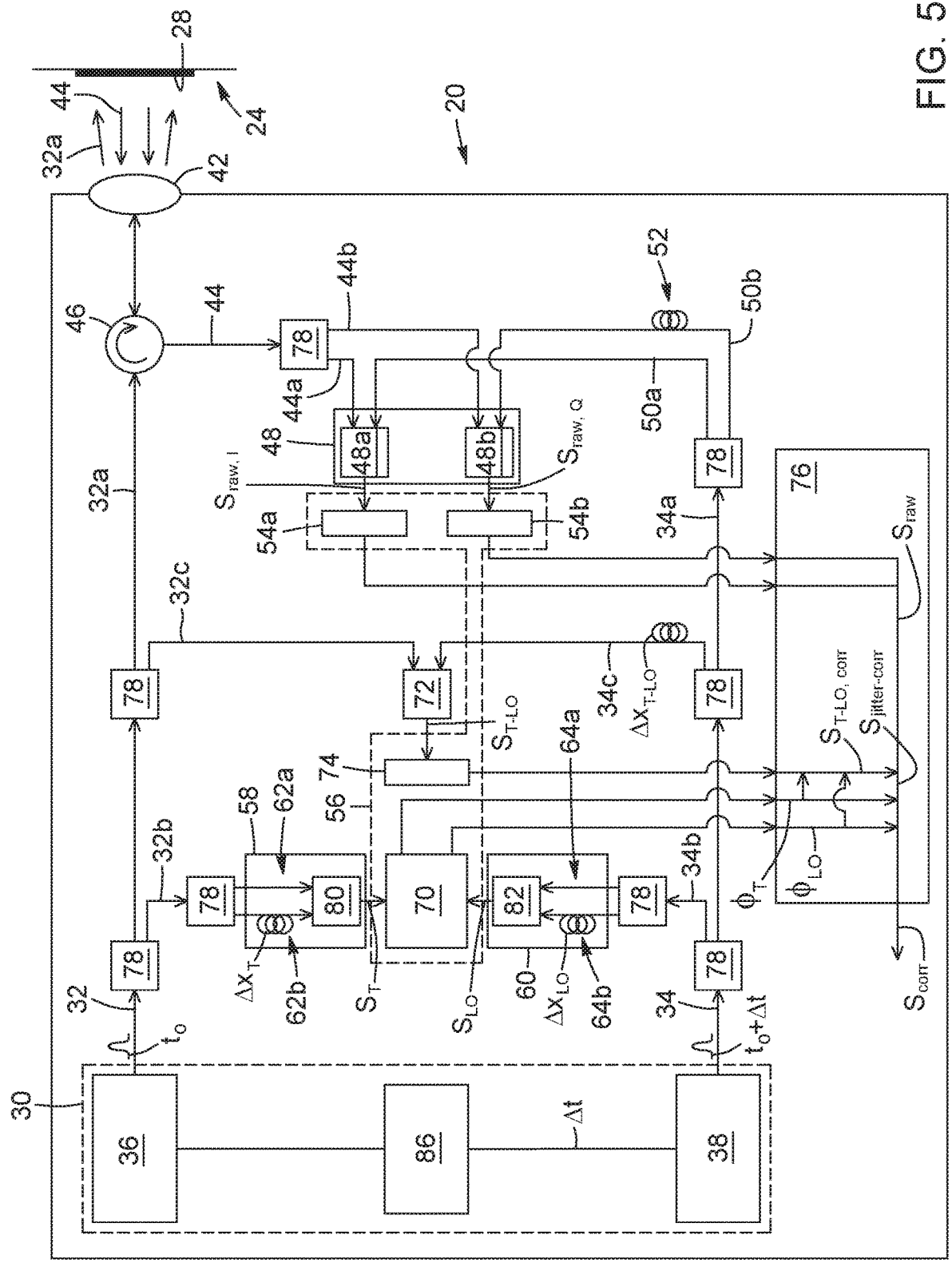
FIG. 5 is a schematic block diagram of an SA imaging system, in accordance with another embodiment.

Referring to FIG. 4, in another embodiment, the source assembly 30 includes a single optical source 40 to generate both the transmission signal 32 and the LO signal 34. Thus, in comparison to the embodiment of FIG. 3 where the transmission signal 32 and the LO signal 34 are generated at time $t_0$ and time $t_0 + \Delta t$ by two distinct optical sources 36, 38, in the embodiment of FIG. 4 the transmission signal 32 and the LO signal 34 are generated at time $t_0$ and time $t_0 + \Delta t$, respectively, as successive optical signals emitted by the same optical source 40. However, in both embodiments, the transmission signal 32 and the LO signal 34 originate from distinct optical signals emitted at different times. In the embodiment of FIG. 4, the transmission signal 32 and the LO signal 34 cannot partially overlap in time because they are emitted from the same optical source 40. This means that when the transmission signal 32 and the LO signal 34 are optical pulses, the time delay Δt cannot be shorter than the minimum achievable pulse repetition period of the optical source 40. As such, if the minimum achievable pulse repetition period is longer than the round-trip time to the target region 28, then it may become necessary to add an optical delay line 84 in the path of the transmission signal 32 and/or the return signal 44.

Returning to FIG. 2, the method 200 also includes a step 206 of transmitting a first portion of the transmission signal onto the target region and collecting a return signal produced by reflection of the first portion of the transmission signal from the target region. In FIG. 3, the SA imaging system 20 includes a transmitter-receiver unit 42 configured to transmit a first portion 32a of the transmission signal 32 onto the target region 28, and to collect a return signal 44 produced by reflection of the first portion 32a of the transmission signal 32 from the target region 28. The transmitter-receiver unit 42 includes transmitting optics configured to direct, collimate, focus or condition the first portion 32a of the transmission signal 32 onto the target region 28, and receiving optics configured to collect the return signal 44 from the target region 28. Depending on the application, the transmitter-receiver unit 42 can include a transmitter and a receiver that are provided as separate devices or combined as a transceiver. In the latter case, an optical circulator 46 can be provided to separate the transmission and return signals, as shown in FIG. 3.

Returning to FIG. 2, the method 200 further includes a step 208 of mixing the return signal with a first portion of the LO signal to provide a raw SA signal $S_{raw}$. As is typical in SAL applications, the SA imaging system 20 of FIG. 3 employs optical heterodyning and IQ demodulation to obtain the raw signal $S_{raw}$ from the return signal 44. In such a case, the raw signal $S_{raw}$ is the signal that results from the beating of the return signal 44 with a first portion 34a of the LO signal 34. The beat frequency of the raw signal $S_{raw}$ then corresponds to the difference between the frequencies of the two mixed signals, which, in the case of chirped signals, depends on the relative time delay between the mixed signals.

In FIG. 3, the SA imaging system 20 includes a return signal mixer 48 configured to mix the return signal 44 with a first portion 34a of the LO signal 34 to provide the raw signal $S_{raw}$. More specifically, the return signal mixer 48 operates as an IQ demodulator configured to perform an in-phase/quadrature demodulation of the return signal 44 and including an in-phase mixer 48a and a quadrature mixer 48b. The phase/quadrature demodulation can involve mixing a first portion 44a of the return signal 44 with an in-phase component 50a of the first portion 34a of the LO signal 34 to obtain an in-phase raw signal $S_{raw,I}$ and mixing a second portion 44b of the return signal 44 with a quadrature component 50b of the first portion 34a of the LO signal 34 to obtain a quadrature raw signal $S_{raw,Q}$. As known in the art, a quarter-wave delay line 52 can be provided to generate the quadrature component 50b of the first portion 34a of the LO signal 34. The SA imaging system 20 also includes an in-phase detector 54a and a quadrature detector 54b to detect and convert into electrical signals the in-phase raw signal $S_{raw,I}$ and the quadrature raw signal $S_{raw,Q}$, respectively. The electrical signals can then be digitally sampled at a frequency satisfying the Nyquist criterion, and digitally stored for later processing. The in-phase and quadrature detectors 54a, 54b can be PIN or avalanche photodiode detectors, although other types of photodetector could be used in other embodiments. It is noted that, in the illustrated embodiment, the detectors 54a, 54b are part of a detector assembly 56, which also includes various additional detectors for measuring optical signals from which phase-error terms can be determined, as will be described below The full complex signal $S_{raw}$ can be reconstructed from the measured in-phase and quadrature signals $S_{raw,I}$ and $S_{raw,Q}$ as $S_{raw} = S_{raw,I} - iS_{raw,Q}$. When the electric fields $E_T(t)$ and $E_{LO}(t)$ of the transmission and LO signals are given by Equations (1) and (2), the measured raw signal $S_{raw}$ can be written as:

$$S_{raw}(t) \propto \sum_l A_l \exp\left\{i\left[2\pi\left(K_{LO}\left(-\frac{\Delta x_l}{c} + \Delta t\right) + K_{LO}\delta t + \Delta f\right)t + 2\pi(f_0 - \Delta f)\right.\right.$$

$$\left.\left.\left(-\frac{\Delta x_l}{c} + \Delta t + \delta t\right) + \phi_T(t) - \phi_{LO}\left(t + \frac{\Delta x_l}{c} - \Delta t - \delta t\right)\right]\right\}. \quad (3)$$

In Equation (3), $A_l$ is the scattering amplitude coefficient of the $l^{th}$ scatterer, $\Delta x_l$ is the round-trip range to the $l^{th}$ scatterer in the target region, c is the speed of light in vacuum, and the summation over l accounts for the fact that the return signal includes a contribution from each discrete scatterer in the target region. From Equation (3), one can see that the beat frequency associated with the measured raw signal $S_{raw}$ can be controlled dynamically by adjusting the nominal time delay $\Delta t$ between the generations of the transmission signal and the LO signal. Equation (3) assumes that the chirp rates $K_T$ and $K_{LO}$ of the transmission and LO signals 32, 34 are nominally identical and that the difference between their values, if any, is negligible. If this difference cannot be neglected, then a chirp rate phase error $i\pi(K_T-K_{LO})t^2$ can be added in the argument of the exponential function in Equation (3).

The raw signal $S_{raw}$ of Equation (3) also includes several error terms: $\phi_T(t)$, $\phi_{LO}(t-\Delta t-\delta t)$, $\delta t$ and $\Delta f$. As mentioned above, the terms $\phi_T(t)$, $\phi_{LO}(t-\Delta t-\delta t)$ are the transmission and LO phase errors that account for deviations of $E_T(t)$ and $E_{LO}(t)$ from perfectly linear chirp waveforms, and the term $\delta t$ is the timing jitter on the nominal time delay $\Delta t$. Meanwhile, the term $\Delta f$ is the frequency-offset jitter that represents the difference between the center frequency $f_0$ of the transmission signal and the center frequency $f_0-\Delta f$ of the LO signal.

The terms $\phi_T(t)$, $\phi_{LO}(t-\Delta t-\delta t)$, $\delta t$ and $\Delta f$, whose values are unknown a priori, introduce errors in the phase history of the return signal which, in turn, can degrade the quality of the reconstructed image. The present techniques provide a method in which values for $\phi_T(t)$, $\phi_{LO}(t-\Delta t-\delta t)$, $\delta t$ and $\Delta f$ are determined and then used to correct phase errors in $S_{raw}$ to obtain a phase-corrected SA signal. In the following, an exemplary, non-limiting approach for obtaining phase correction factors from the raw signal $S_{raw}$ will be described.

Returning to FIG. 2, the method 200 includes a step 210 of determining, using a second portion of the transmission signal, the transmission phase error $\phi_T$ associated with the transmission signal, and a step 212 of determining, using a second portion of the LO signal, the LO phase error $\phi_{LO}$ associated with the LO signal.

As illustrated in the embodiment of FIG. 3, the SA imaging system 20 can include a transmission interferometer 58 configured to determine the transmission phase error $\phi_T$ and an LO interferometer 60 configured to determine the LO phase error $\phi_{LO}$. The transmission interferometer 58 is configured to mix a second portion 32b of the transmission signal 32 with a spatially delayed version thereof to produce a transmission interference signal $S_T$. The transmission interferometer 58 includes a reference line 62a and an optical delay line 62b, the latter introducing an optical delay $\Delta x_T$ with respect to the former to provide the spatially delayed version of the second portion 32b of the transmission signal 32. The transmission interferometer 58 also includes a mixer 80 configured to mix the original and delayed versions of the second portion 32b of the transmission signal 32. Likewise, the LO interferometer 60 is configured to mix a second portion 34b of the LO signal 34 with a spatially delayed version thereof to produce the LO interference signal $S_{LO}$. The LO interferometer 60 includes a reference line 64a and an optical delay line 64b, the latter introducing an optical delay $\Delta x_{LO}$ with respect to the former to provide the spatially delayed version of the second portion 34b of the LO signal 34. The LO interferometer 60 also includes a mixer 82 configured to mix the original and delayed versions of the second portion 34b of the LO signal 34.

In some implementations, the transmission interference signal $S_T$ outputted by the transmission interferometer 58 and the LO interference signal $S_{LO}$ outputted by the LO interferometer 60 can be received and detected by two distinct optical detectors 66, 68 of the detector assembly 56, for example PIN or avalanche photodiode detectors. This case is illustrated in FIG. 3. However, referring to the embodiment of FIG. 5, in other implementations, the transmission interference signal $S_T$ and the LO interference signal $S_{LO}$ can be measured on the same optical detector 70 of the detector assembly 56. In such a case, the path length difference between the transmission interferometer 58 and the LO interferometer 60 is preferably large enough to ensure that the mixing of the transmission interference signal $S_T$ and the LO interference signal $S_{LO}$ produces a mixed signal having a beat frequency that is significantly higher than the detector bandwidth and, thus, not measured by the optical detector 70.

When the electric fields $E_T(t)$ and $E_{LO}(t)$ of the transmission and LO signals are given by Equations (1) and (2), the measured transmission interference signal $S_T$ and the LO interference signal $S_{LO}$ can be written as:

$$S_T(t) \propto \cos\left[2\pi K_T\left(\frac{\Delta x_T}{c}\right)t + \phi_T(t) - \phi_T\left(t - \frac{\Delta x_T}{c}\right)\right], \quad (4)$$

$$S_{LO}(t) \propto \cos\left[2\pi K_{LO}\left(\frac{\Delta x_{LO}}{c}\right)t + \phi_{LO}(t) - \phi_{LO}\left(t - \frac{\Delta x_{LO}}{c}\right)\right]. \quad (5)$$

Once the interference signals $S_T$ and $S_{LO}$ have been measured, converted to electrical signals and stored as signal data, various analysis and computational techniques can be employed to extract the transmission phase error $\phi_T$ and the LO phase error $\phi_{LO}$. By way of example, such techniques can involve extracting the phase of the measured interference signal; isolating the phase component $\phi(y)-\phi(t-\Delta x/c) \approx (\Delta x/c)\partial\phi/\partial t$; and numerically integrating $(\Delta x/c)\partial\phi/\partial t$ over time to obtain $\phi(t)$.

Returning to FIG. 2, the method 200 further includes a step 214 of mixing a third portion of the transmission signal with a third portion of the LO signal to provide a transmission-LO (T-LO) signal, and a step 216 of determining, from the T-LO signal and based on the transmission phase error and the LO phase error, a frequency jitter between the transmission signal and the LO signal.

In FIG. 3, the SA imaging system 20 includes a T-LO mixer 72 configured to mix a third portion 32c of the transmission signal 32 with a third portion 34c of the LO signal 34 to produce a transmission-LO signal $S_{T-LO}$. The T-LO mixer 72 can be embodied by an optical combiner. The transmission-LO signal $S_{T-LO}$ outputted by the T-LO mixer 72 can be received and detected by an optical detector 74, for example a PIN or avalanche photodiode detector. To enable the measurement of the transmission-LO signal $S_{T-LO}$ for a wide range of time delays $\Delta t$ between the transmission signal 32 and the LO signal 34, the detector 74 measuring $S_{T-LO}$ can be provided with a significantly larger bandwidth than the detectors 54a, 54b, 66, 68 measuring the in-phase raw SA signal $S_{raw,I}$, the quadrature raw SA signal $S_{raw,Q}$, the transmission interference signal $S_T$ and the LO interference signal $S_{LO}$, respectively. For example, in some implementations, the bandwidths of the detectors 54a, 54b, 66, 68 can be about 200 megahertz (MHz), while the bandwidth of the detector 74 can be about 25 gigahertz (GHz) to allow the time delay $\Delta t$ between the transmission signal 32 and the LO signal 34 to be adjusted to accommodate target range fluctuations of about ±200 m.

Because of the time delay $\Delta t$ between the generation of the transmission signal 32 and the generation of the LO signal 34 and, optionally, the existence of a fixed path length difference $\Delta x_{T-LO}$ between the third portion 32c of the transmission signal 32 and the third portion 34c of the LO signal 34, the transmission-LO signal $S_{T-LO}$ is a beat signal whose frequency depends on $\Delta t$ and, if present, $\Delta x_{T-LO}$. When the electric fields $E_T(t)$ and $E_{LO}(t)$ of the transmission and LO signals are given respectively by Equations (1) and (2), the T-LO signal $S_{T-LO}$ measured by the optical detector 74 can be written as:

$$S_{T-LO}(t) \propto \cos\left\{2\pi\left[K_{LO}\left(-\frac{\Delta x_{T-LO}}{c}+\Delta t\right)+K_{LO}\delta t+\Delta f\right]t+2\pi(f_0-\Delta f)\right. \quad (6)$$
$$\left.\left(-\frac{\Delta x_{T-LO}}{c}+\Delta t+\delta t\right)+\phi_T(t)-\phi_{LO}\left(t+\frac{\Delta x_{T-LO}}{c}-\Delta t-\delta t\right)\right\}.$$

The T-LO signal $S_{T-LO}$ depends on the transmission and LO phase errors $\phi_T$ and $\phi_{LO}$, whose values can be determined from the transmission and LO interference signals $S_T$ and $S_{LO}$ outputted respectively by the transmission and LO interferometers 58, 60, as well as on the time jitter $\delta t$ and the frequency-offset jitter $\Delta f$, whose values can be determined from $S_{T-LO}$ using the previously determined values for $\phi_T$ and $\phi_{LO}$, as will now be described. The terms $K_{LO}\delta t+\Delta f$ in Equation (6) represent the total frequency jitter between the transmission signal 32 and the LO signal 34, that is, the sum of the error $\delta t$ on the time delay $\Delta T$ and of the frequency offset $\Delta f$ between the transmission signal 32 and the LO signal 34.

In some implementations, the jitters $\Delta t$ and $\delta t$ can be extracted from sweep-to-sweep fluctuations in the peak position of the frequency spectrum of the measured T-LO signal $S_{T-LO}$. First, a corrected version of $S_{T-LO}$ is computed, yielding:

$$S_{T-LO,corr}(t)=S_{T-LO}(t)\exp\left\{-i\left[\phi_T(t)-\phi_{LO}\left(t+\frac{\Delta x_{T-LO}}{c}-\Delta t-\delta t'\right)\right]\right\}. \quad (7)$$

The argument of the exponential function in Equation (7) is a phase correction factor, in which $\phi_T$ and $\phi_{LO}$ are known from Equations (4) and (5) and $\delta t'$ is an estimation of $\delta t$ obtained from a minimization of the spectral linewidth of $S_{T-LO}$. The total frequency jitter $K_{LO}\delta t+\Delta f$ can then be evaluated by determining the peak position of the frequency spectrum of $S_{T-LO,corr}$. It will be understood that other analytical and/or numerical computational techniques can be used in other embodiments to determine the frequency jitter $K_{LO}\delta t+\Delta f$.

Figure 6:
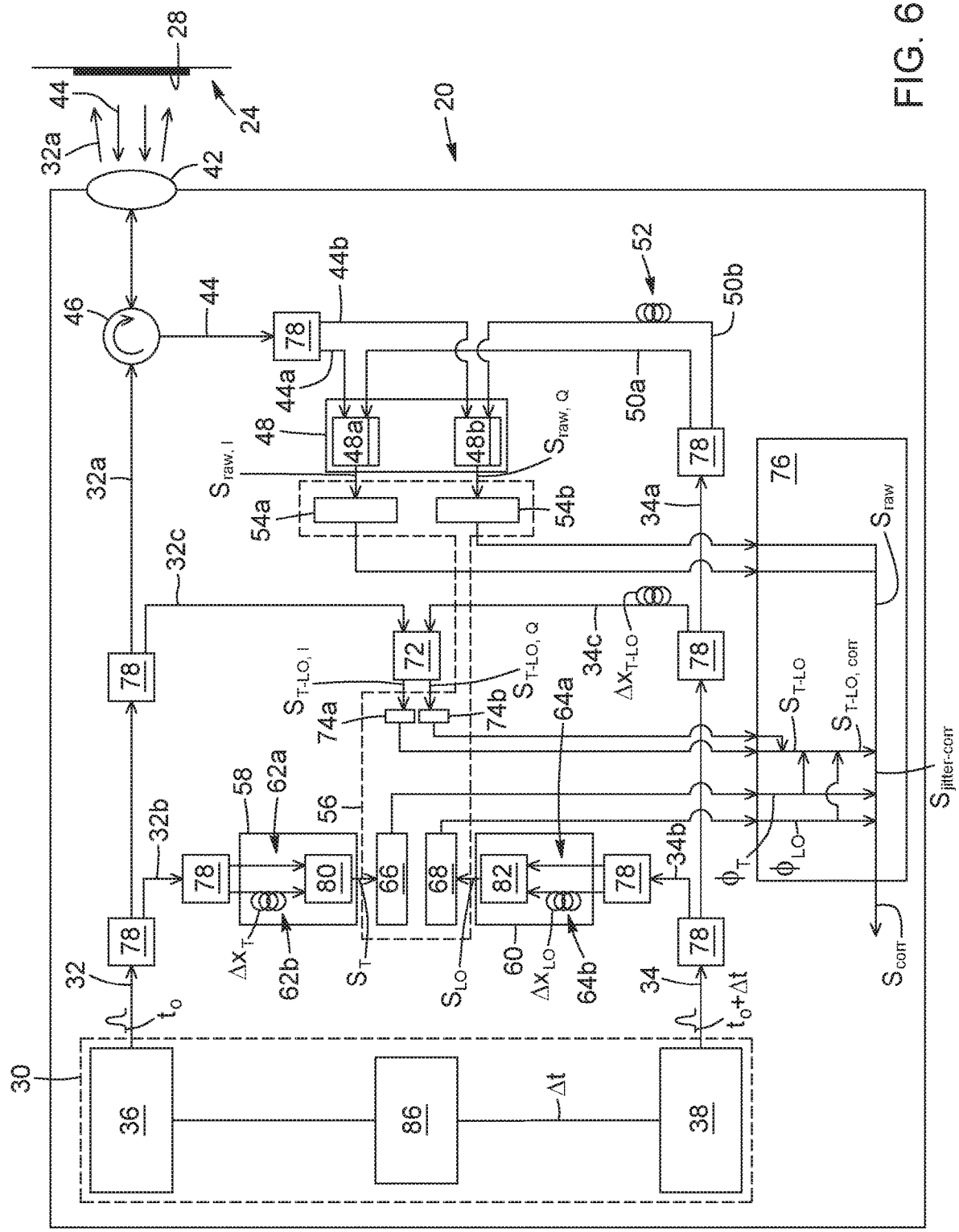
FIG. 6 is a schematic block diagram of an SA imaging system, in accordance with another embodiment.

Referring to FIG. 6, in some implementations, the T-LO mixer 72 can be an IQ demodulator configured to mix the transmission signal 32 and the LO signal 34 both in phase, to yield an in-phase T-LO signal $S_{T-LO,I}$, and in quadrature, to yield a quadrature T-LO signal $S_{T-LO,Q}$. In such a case, the SA imaging system 20 includes an in-phase detector 74a to detect $S_{T-LO,I}$, and a quadrature detector 74b to detect $S_{T-LO,QI}$. The implementation shown in FIG. 6 can be useful when it is desired or required to evaluate, if any, the impact of the chirp rate phase error $i\pi(K_T-K_{LO})t^2$ related to the chirp rate difference between the transmission signal 32 and the LO signal 34.

Returning to FIG. 2, once the phase errors $\phi_T$ and $\phi_{LO}$ on the individual transmission and LO signals and the frequency jitter $K_{LO}\delta t+\Delta f$ therebetween have been determined, the method 200 can include a step 218 of applying a phase correction to the raw SA signal $S_{raw}$ based on $\phi_T$, $\phi_{LO}$ and $K_{LO}\delta t+\Delta f$ to obtain a phase-corrected SA signal $S_{corr}$.

In some implementations, the phase correction can include a first step of obtaining a "jitter-corrected" raw SA signal $S_{jitter-corr}$, by multiplying $S_{raw}$ by a phase correction factor $\exp[-i2\pi(K_{LO}\delta t+\Delta f)t-i2\pi f_0\delta t]$:

$$S_{jitter-corr}(t)=S_{raw}\exp[-i2\pi(K_{LO}\delta t+\Delta f)t-i2\pi f_0\delta t] \quad (8)$$
$$\propto \sum_l A_l \exp\left\{i\left[2\pi K_{LO}\left(-\frac{\Delta x_l}{c}+\Delta t\right)t+\right.\right.$$
$$2\pi f_0\left(-\frac{\Delta x_l}{c}+\Delta t\right)-2\pi\Delta f\left(-\frac{\Delta x_l}{c}+\Delta t+\delta t\right)+$$
$$\left.\left.\phi_T(t)-\phi_{LO}\left(t+\frac{\Delta x_l}{c}-\Delta t-\delta t\right)\right]\right\}.$$

The phase correction can also include a second step of correcting phase errors due to $\phi_T$, $\phi_{LO}$ and $\Delta f$ in Equation (8). This yields:

$$S_{corr}(t)_{f_i;f_i+\delta f}=IFFT\{FFT[S_{jitter-corr}(t)]*Filter(f_i\leq f\leq f_i+\delta f)\}\times \quad (9)$$
$$\exp\left\{-i\left[\phi_T(t)-\phi_{LO}\left(t+\frac{\Delta x_{f_i;f_i+\delta f}}{c}-\Delta t-\delta t\right)\right]+\right.$$
$$\left.i2\pi\Delta f\left(-\frac{\Delta x_{f_i;f_i+\delta f}}{c}+\Delta t+\delta t\right)\right\}\propto$$
$$\sum_{f_i<K_{LO}\left|\frac{\Delta x_l}{c}-\Delta t\right|<f_i+\delta f} A_l\exp\left[i2\pi K_{LO}\left(-\frac{\Delta x_l}{c}+\Delta t\right)t+\right.$$
$$\left.i2\pi f_0\left(-\frac{\Delta x_l}{c}+\Delta t\right)\right].$$

In Equation (9), FFT denotes a fast Fourier transform, IFFT denotes an inverse FFT, $\Delta x_{f_i;f_i+\delta f}$ is the average round-trip range to those scatterers in the target region that produce beat signals in the frequency band $[f_i; f_i+\delta f]$, and Filter $(f_i \leq f \leq f_i+\delta f)$ denotes a bandpass filter that passes the signal $FFT[S_{jitter-corr}(t)]$ in the frequency band $[f_i; f_i+\delta f]$ and rejects out-of-band frequencies. The summation in Equation (9) is performed over all the scatterers having a round-trip range $\Delta x_l$ within the round-trip range interval defined by the band $[f_i; f_i+\delta f]$. In some implementations, the term proportional to $\Delta f$ in the phase correction factor applied in Equation (9) can be neglected. This is the case when $\Delta f$ is negligible as compared to the center frequency $f_0$. The total corrected signal $S_{corr}$ can be obtained by summing Equation (9) over all the frequency bands in which beat signals are measured:

$$S_{corr}(t)=\Sigma_i S_{corr}(t)_{f_i;f_i+\delta f}. \quad (10)$$

In some implementations, the difference between the chirp rate $K_T$ of the transmission signal and the chirp rate $K_{LO}$ of the LO signal may not be negligible. Referring to FIG. 6, in such implementations, if the quadratic term $i\pi(K_T-K_{LO})t^2$ remains sufficiently constant from pulse to pulse and is within the bandwidth of the detectors 74a and 74b coupled to the T-LO mixer 72, then the chirp rate difference between the transmission signal 32 and the LO signal 34 can be compensated for by multiplying the measured signal by the correction factor $\exp[i\pi(K_T-K_{LO})t^2]$ in Equations (6) and (8).

Once the phase-corrected SA signal $S_{corr}$ has been obtained, for example from Equation (10), it may then be processed using known SA processing techniques involving, for example, FFT and matched filtering algorithms, or optronic processing, to reconstruct an image of the target region in which the impact of phase errors arising from the fact that the transmission signal and the LO signals originate from distinct and time-delayed pulses is mitigated. In this regard, it will be understood by those skilled in the art that various techniques could be employed, given the many approaches and algorithms available for numerically and/or optronically processing SA data.

Returning to FIG. 3, the SA imaging system 20 includes a processing unit 76. The processing unit 76 is coupled to the detector assembly 56 and configured to control and execute the operations required for performing the phase error determination and correction steps described above to obtain a phase-corrected SA signal. These steps include, without limitation: determining, from the transmission interference signal $S_T$, a transmission phase error $\phi_T$ associated with the transmission signal 32; determining, from the LO interference signal $S_{LO}$, the LO phase error $\phi_{LO}$ associated with the LO signal 34; determining, from the transmission-LO signal $S_{T-LO}$ and based on the determined transmission and LO phase errors $\phi_T$ and $\phi_{LO}$, the frequency jitter $K_{LO}\delta t+\Delta f$ between the transmission signal 32 and the LO signal 34; and applying a phase correction to the raw SA signal $S_{raw}$ based on $\phi_T$, $\phi_{LO}$ and $K_{LO}\delta t+\Delta f$ to obtain a phase-corrected SA signal $S_{corr}$. Depending on the application, the processing unit 76 can be implemented as a single unit or as a plurality of interconnected sub-units, and be implemented in hardware, software, firmware or any combination thereof. For example, the processing unit 76 can be embodied by a microprocessor, a central processing unit (CPU), a microcontroller, or by any other processing resource or any combination of such processing resources configured to operate collectively as a processing unit. In some variants, the processing unit 76 can be implemented as an optronic processor. Depending on the application, the signal data can be transmitted from the detector assembly 56 to the processing unit 76 via wired and/or wireless transmission. Depending also on the application, at least some aspects of the phase-error determination and correction can be performed in real-time or near real-time, or at later time after signal measurements.

Of course, numerous modifications could be made to the embodiments described above without departing from the scope of the appended claims.

The invention claimed is:

1. A method for phase-error correction in a synthetic aperture (SA) imaging system, the method comprising:
    (a) generating a transmission signal;
    (b) generating a local oscillator (LO) signal, the transmission signal and the LO signal being generated with a time delay relative to each other;
    (c) transmitting the transmission signal onto a target region and collecting a return signal produced by reflection of the transmission signal from the target region;
    (d) mixing the return signal with the LO signal to provide a raw SA signal;
    (e) mixing the transmission signal with a time-delayed version of the transmission signal to produce a transmission interference signal, and determining from the transmission interference signal, a transmission phase error associated with the transmission signal;
    (f) mixing the LO signal with a time-delayed version of the LO signal to produce an LO interference signal, and determining from the LO interference signal, an LO phase error associated with the LO signal;
    (g) mixing the transmission signal with the LO signal to provide a transmission-LO signal, and determining, from the transmission-LO signal and based on the transmission phase error and the LO phase error, a frequency jitter between the transmission signal and the LO signal; and
    (h) applying a phase correction to the raw SA signal based on the transmission phase error, the LO phase error and the frequency jitter to obtain a phase-corrected SA signal.

2. The method of claim 1, wherein step (a) comprises generating the transmission signal as a transmission laser pulse signal, and wherein step (b) comprises generating the LO signal as an LO laser pulse signal.

3. The method of claim 1, wherein each one of the transmission signal and the LO signal has a center frequency ranging from 30 terahertz to 300 terahertz.

4. The method of claim 1, wherein step (a) comprises performing a linear chirp modulation of the transmission signal, and wherein step (b) comprises performing a linear chirp modulation of the LO signal.

5. The method of claim 4, further comprising a step of determining a chirp rate phase error related to a chirp rate difference between the transmission signal and the LO signal, and wherein step (h) further comprises applying the phase correction factor to the raw SA signal based further on the chirp rate phase error.

6. The method of claim 1, wherein step (b) comprises adjusting the time delay based on a round-trip time to the target region.

7. The method of claim 1, wherein step (g) comprises determining the frequency jitter as a sum of a first term accounting for an error on the time delay between the transmission signal and the LO signal and a second term accounting for a frequency offset between the transmission signal and the LO signal.

8. The method of claim 1, wherein step (d) comprises performing a quadrature demodulation of the return signal comprising mixing the return signal with in-phase and quadrature components of the LO signal.

9. The method of claim 1, wherein steps (a) and (b) comprise generating the transmission signal and the LO signal from different optical sources.

10. A synthetic aperture (SA) imaging system comprising:
    a source assembly generating a transmission signal and a local oscillator (LO) signal, the transmission signal and the LO signal being generated with a time delay relative to each other;
    a transmitter-receiver unit transmitting the transmission signal onto a target region, and collecting a return signal produced by reflection of the transmission signal from the target region;
    a return signal mixer configured to mix the return signal with the LO signal to provide a raw SA signal;
    a transmission interferometer configured to mix the transmission signal with a time-delayed version of the transmission signal to produce a transmission interference signal;
    an LO interferometer configured to mix the LO signal with a time-delayed version of the LO signal to produce an LO interference signal;
    a transmission-LO mixer configured to mix the transmission signal with the LO signal to produce a transmission-LO signal;

a detector assembly detecting the raw SA signal, the transmission interference signal, the LO interference signal and the transmission-LO signal outputted by the return signal mixer, the transmission interferometer, the LO interferometer and the transmission-LO mixer, respectively; and a processing unit coupled to the detector assembly and configured to:
  determine, from the transmission interference signal, a transmission phase error associated with the transmission signal;
  determine, from the LO interference signal, an LO phase error associated with the LO signal;
  determine, from the transmission-LO signal and based on the transmission phase error and the LO phase error, a frequency jitter between the transmission signal and the LO signal; and
  apply a phase correction to the raw SA signal based on the transmission phase error, the LO phase error and the frequency jitter to obtain a phase-corrected SA signal.

11. The SA imaging system of claim 10, wherein the source assembly comprises at least one pulsed laser source.

12. The SA imaging system of claim 10, wherein the source assembly comprises a transmission optical source configured to generate the transmission signal and an LO optical source distinct from the transmission optical source and configured to generate the LO signal.

13. The SA imaging system of claim 10, wherein each one of the transmission signal and the LO signal has a center frequency ranging from 30 terahertz to 300 terahertz.

14. The SA imaging system of claim 10, wherein the source assembly is configured to linearly chirp the transmission signal and the LO signal.

15. The SA imaging system of claim 14, wherein the processing unit is configured to determine a chirp rate phase error related to a chirp rate difference between the transmission signal and the LO signal, and to apply the phase correction factor to the raw SA signal based further on the chirp rate phase error.

16. The SA imaging system of claim 10, wherein the processing unit is configured to control the source assembly to adjust the time delay based on a round-trip time to the target region.

17. The SA imaging system of claim 10, wherein the processing unit is configured to determine the frequency jitter as a sum of a first term accounting for an error on the time delay between the transmission signal and the LO signal and a second term accounting for a frequency offset between the transmission signal and the LO signal.

18. The SA imaging system of claim 10, wherein the return signal mixer is configured to perform a quadrature demodulation of the return signal by mixing the return signal with in-phase and quadrature components of the LO signal.

* * * * *